May 15, 1923.  1,454,912
W. E. TATE, SR
LAWN MOWER
Filed Aug. 9, 1921  3 Sheets-Sheet 1
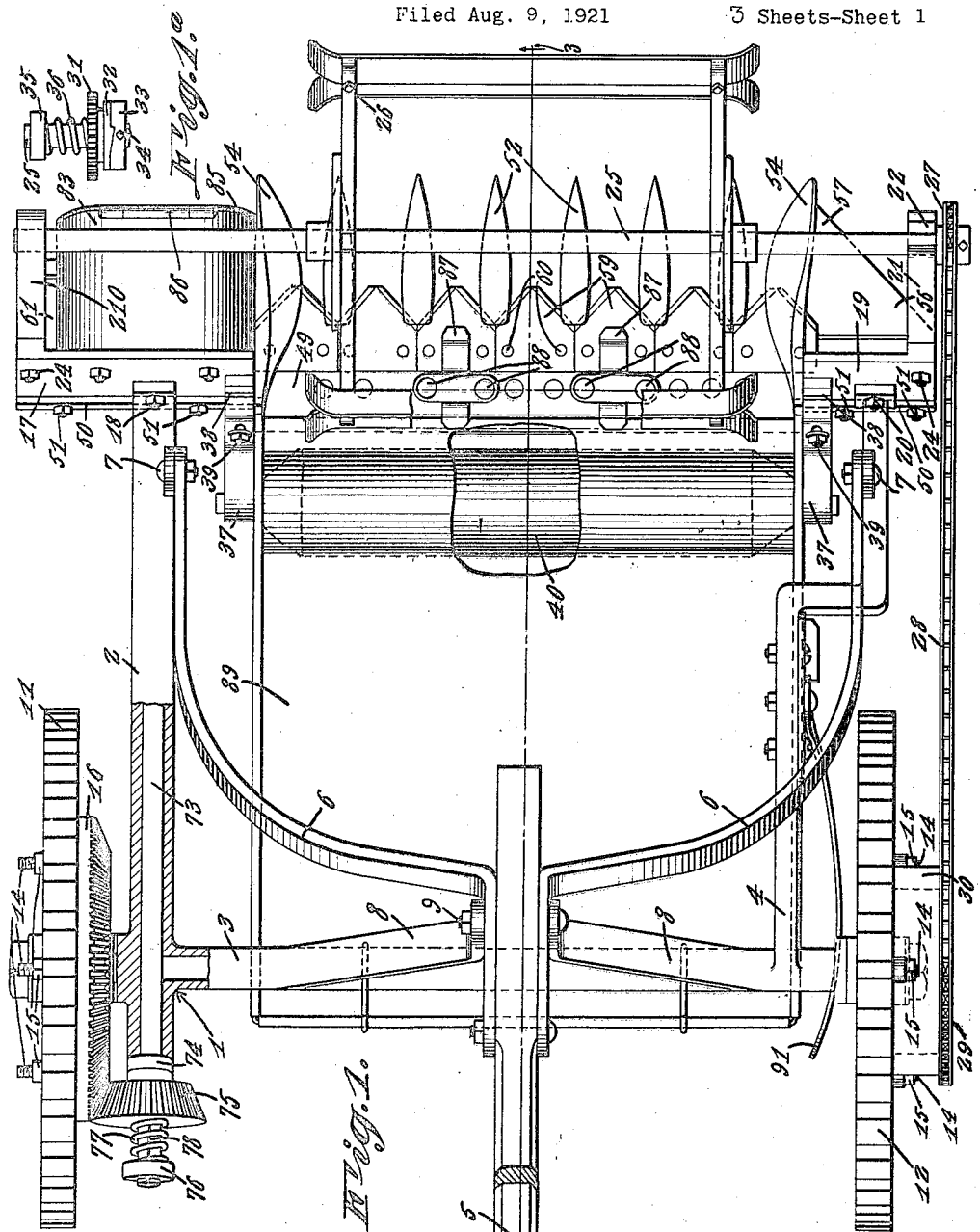

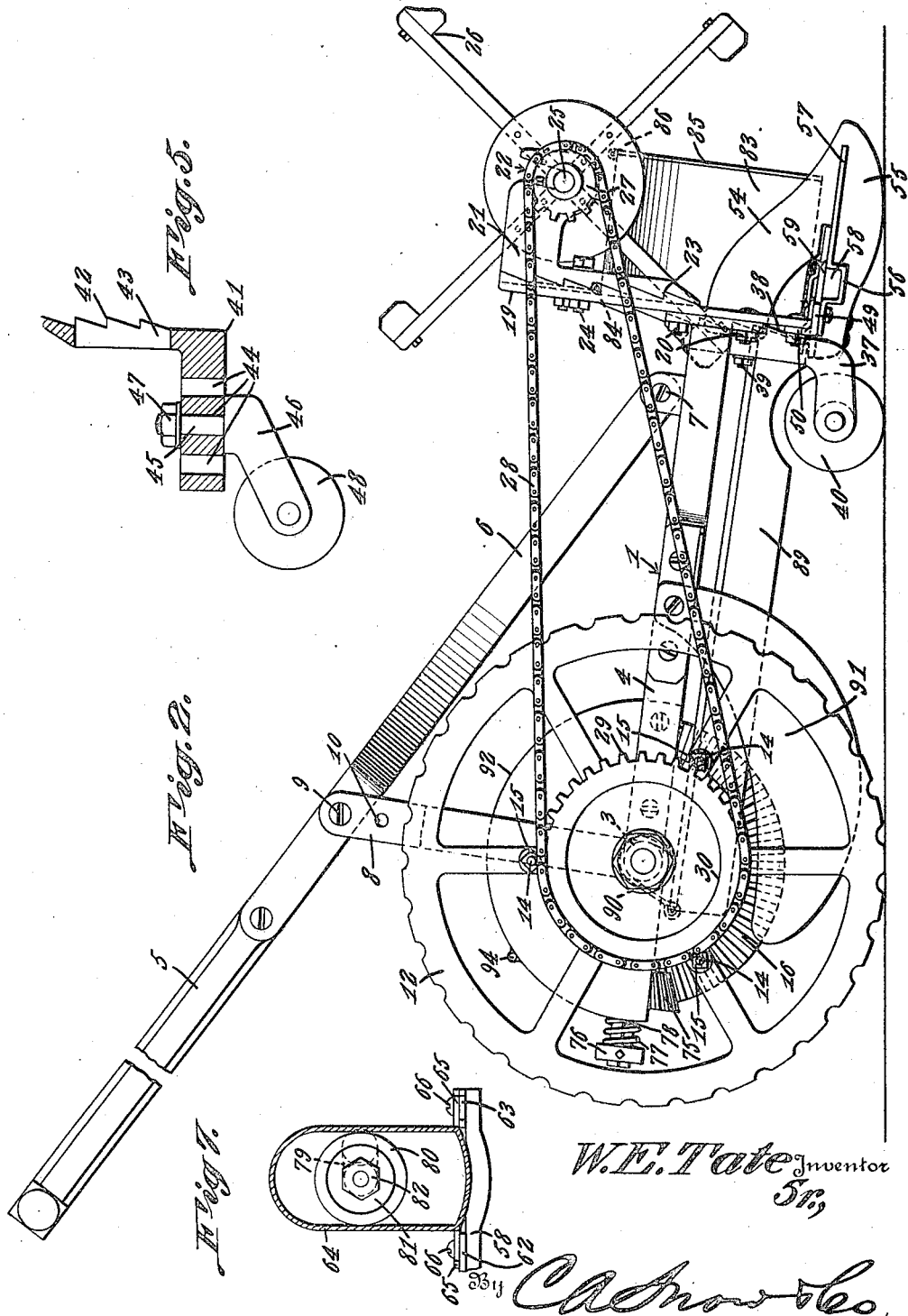

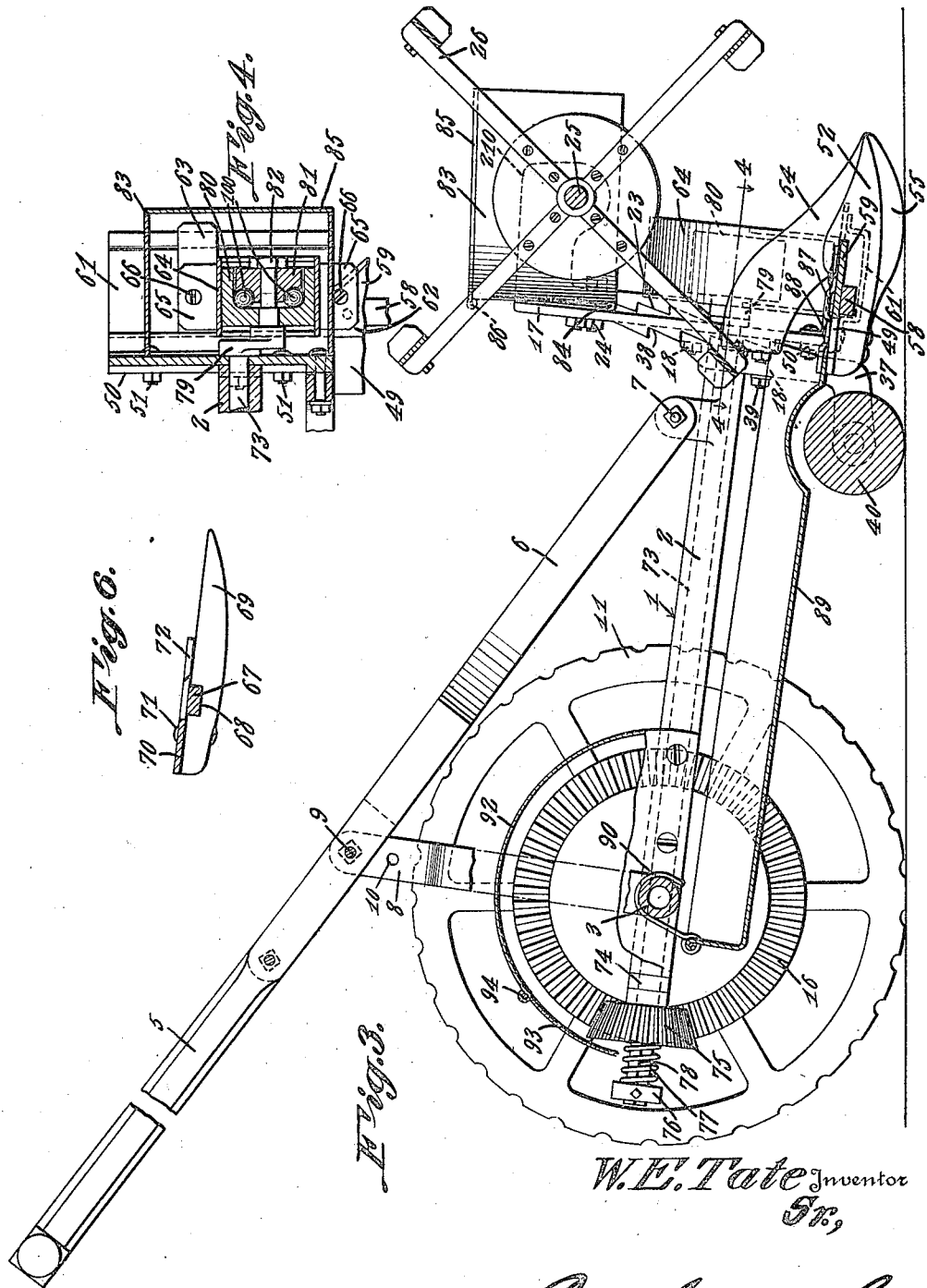

Patented May 15, 1923.

1,454,912

UNITED STATES PATENT OFFICE.

WILLIAM ELBERT TATE, SR., OF WEATHERFORD, TEXAS.

LAWN MOWER.

Application filed August 9, 1921. Serial No. 490,977.

*To all whom it may concern:*

Be it known that I, WILLIAM E. TATE, Sr., a citizen of the United States, residing at Weatherford, in the county of Parker and State of Texas, have invented a new and useful Lawn Mower, of which the following is a specification.

The device forming the subject matter of this invention is a lawn mower, and the invention aims to provide a mower of the type specified which will handle long or short grass with equal facility, novel means being provided for reciprocating the cutter bar and for operating other instrumentalities forming part of the machine.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in top plan, a machine constructed in accordance with the invention, parts being broken away; Figure 1ᵃ is a view supplemental to Figure 1 and showing one end of the reel shaft and parts carried thereby; Figure 2 is a side elevation of a mower; Figure 3 is a section on the line 3—3 of Figure 1, parts being in elevation; Figure 4 is a section taken approximately on the line 4—4 of Figure 3; Figure 5 is a sectional detail showing a modification in the roll support; Figure 6 is a sectional detail showing a modification in the cutting mechanism; and Figure 7 is a front elevation, diagrammatic in nature, and showing a portion of the means whereby rotation is imparted to the cutter bar.

In carrying out the invention there is provided a frame denoted generally by the numeral 1. The frame, roughly considered, is U-shaped in top plan, as shown in Figure 1, including a tubular side member forming a bearing 2, a side bar 4 disposed approximately parallel to the bearing, and a tubular rear cross piece 3 connecting the bearing and the bar. A handle 5 is provided and includes forks 6 pivotally connected at 7 (Figure 2) to the bearing 2 and to the side bar 4. Braces 8 upstand from the cross piece 3 of the frame and are connected at their upper ends by a securing device 9 (Figure 2) to the handle 5, there being a plurality of holes 10 in the braces 8, for the reception of the securing device 9, the construction being such that the rear end of the handle may be raised and lowered to accommodate the stature of the operator.

Ground wheels 11 and 12 are supported for rotation on the frame 1 adjacent to the ends of the cross piece 3. The wheels 11 and 12 are provided with threaded studs 14 carrying nuts 15. A beveled gear 16 is secured to the wheel 11.

An upright plate 17 is secured at 18 to the forward end of the bearing 2, an upright plate 19 being secured at 20 to the forward end of the cross bar 4. The plate 19 has a forwardly presented bearing 21 provided with a notch or seat 22, the plate 17 having a forwardly presented bearing 210. There are racks 23 on the bearings 210 and 21, as well as on the plates 17 and 19, the construction being such that the bearings can be adjusted vertically on the plates, the bearings being held to the plates by bolts 24 or the like. A shaft 25 is journaled in the bearing 210 and in the notch 22 in the bearing 21 and carries a reel 26, it being obvious that the reel may be adjusted vertically, since the bearings 21 and 210 are adjustable vertically on their respective supports, as hereinbefore explained.

A sprocket wheel 27 is secured to one end of the shaft 25 and is engaged with a sprocket chain 28 passed around a sprocket wheel 29, the hub of the sprocket wheel being denoted by the numeral 30 and being held, by the studs 14 and the nuts 15 of the wheel 12 on the said wheel. The drive for the reel 26, therefore, is derived from the wheel 12, since, when the wheel 12 is rotated, rotation will be imparted to the shaft 25 of the reel 26 through the instrumentality of the sprocket wheels 29 and 27 and the sprocket chain 28. Should it be desired to drive the reel from the wheel 11 the sprocket wheel 29 may be shifted over to the wheel 11 and be held thereon by the corresponding studs 14 and nuts 15, the chain 28 being engaged with a sprocket wheel 31 located on the shaft 25 as shown in Figure 1ª. The sprocket wheel 31 is loose on the shaft 25, but, normally, is coupled to the said shaft by a clutch member 32 on the sprocket wheel 31, the clutch member 32 coacting with a clutch member 33 secured at 34 to the shaft 25. The shaft 25 carries an abutment 35. A compression spring 36 surrounds the shaft 25 and bears at one end on the abutment 35, the other end of the spring bearing on the sprocket wheel 31, to hold the clutch members 32 and 33 interengaged, so that when rotation is imparted to the sprocket wheel 31, from the wheel 11, by means of the sprocket chain 28, the shaft 25 and the reel 26 will be rotated also.

Brackets 37 are provided, and are supplied with racks 38, adapted to engage corresponding racks on the plates 17 and 19, the brackets 37 thus being vertically adjustable. The brackets are held on the plates by securing devices 39. A roller 40 is journaled in the brackets 37 and extends transversely of the machine. The roller 40 traverses the surface of the ground as shown in Figure 2, and should it be desired to raise the forward end of the machine to a greater height than that shown in Figure 2, recourse is had to the brackets 41 shown in Figure 5, each bracket having a rack 42 corresponding to the rack 38 and being provided with an elongated slot 43 for the reception of the securing device 39. In the horizontal portion of the bracket 41 there are openings 44, in any of which may be mounted the stem 45 of a hanger 46, there being a nut 47 on the stem, to hold the hanger on the bracket. The roller, denoted by the numeral 48 is journaled in the hangers 46, it being obvious that when the construction shown in Figure 5 is used, the front end of the machine will be raised compared with the result obtained when the brackets 37 of Figure 2 are used.

A cross bar 49 extends transversely of the machine at the front thereof and terminates in angle pieces 50 held by securing elements 51 on the plates 17 and 19. The cross bar 49 may be considered as a part of the main frame of the machine. Fingers 52 are secured at 53 to the cross bar 49. The outermost fingers are provided with upstanding, forwardly extended guiding wings 54, the said fingers have depending shoes 55, shown in Figure 3 and adapted to move along, or close to, the surface of the ground.

A guide 56 is secured to the member 50 of the cross bar 49 adjacent to the plate 19, a trough-shaped shield 61 being similarly mounted with respect to the plate 17. The guide 56 is extended horizontally, as shown at 57 in Figure 1, into engagement with the adjacent wing 54.

A bar 58 is mounted for reciprocation in the fingers 52 and the guide 56, the blades 59 being secured at 60 to said bar 58 and working through the fingers 52 in accordance with known mower construction practice. In this connection, however, it is to be understood that the fingers may be constructed as desired. Thus, in the modification shown in Figure 6, the cutter bar, corresponding to the bar 58 is denoted by the numeral 67 and slides in a seat or notch 68 formed in the finger 69, the cross bar, corresponding to the part 49, being designated by the numeral 70 and the finger 69 being secured at 71 to the cross bar. The cutter 72 is secured to the bar 67 and reciprocates on the upper surface of the finger 69. Figure 6 will render it evident that the specific mower or finger construction may be changed without jeopardizing the utility of the invention.

The terminal blade 59 which is adjacent to the blade 17 is provided with an extension 62. A supporting arm 63 extends forwardly from the bar 58 and slides on the upper edge of the trough-shaped shield 61. A vertically elongated head 64 is provided, and has ears 65 superposed on the extension 62 and on the arm 63 and connected thereto, and to the bar 58, as indicated at 66. A shaft 73 is journaled for rotation in the bearing 2 and is provided with an abutment 74 engaging the rear end of the bearing. The rear end of the shaft 73 is squared, as indicated at 78 or is constructed otherwise, so as to retain, for rotation a pinion 75 meshing into the beveled gear 16 on the wheel 11, the construction being such that the pinion 75 may, upon occasion, have a sliding movement longitudinally of the shaft 73. There is a head 76 on the extreme rear end of the shaft 73, a compression spring 77 surrounding the part 78 of the shaft and abutting against the head 76 and the pinion 75. The function of the spring 77 is to hold the pinion 75 normally in mesh with the gear 16, but should the cutting mechanism at the front of the machine become clogged, the spring 77 will be compressed, the pinion 75 moving rearwardly on the part 78 of the shaft 73, and preventing either a breaking of the cutting mechanism or a stripping of the teeth of the gear members 75 and 16.

The forward end of the shaft 73 passes through the plate 17 and carries a crank 79 whereon is journaled a cup-shaped annular ball race 80 located within the elongated head 64 on the cutter bar 58. A ball retainer 81 is held on the end of the crank 79 by a nut 82, balls 100 being interposed between the ball race 80 and the retainer 81 and being located within the race. The elongated head 64 on the cutter bar 58 is located within a box-like casing 83 hinged at 84 to the plate 17 and provided with a lid 85 which is hingedly mounted on the casing 83 as indicated at 86. The lid 85 may be swung to an open position with respect to the casing 83, or the casing 83 may be swung upwardly, as shown in Figure 3, thereby to expose the head 64 of the cutter bar 58, the crank 79 and attendant parts. Likewise, with a view to protecting the intermeshing gear elements 75 and 16, the same may be disposed beneath a shield 92, mounted on the frame 1, the shield carrying a rear door 93, hingedly mounted on the shield, as shown at 94 and giving access to the gear elements 75 and 16, at their point of intermeshing. Clips 87 extend transversely of the bar 49 and are secured thereto, as indicated at 88. The blades 59 of the cutting mechanism reciprocate beneath the forward ends of the clips 87, whereas the rear ends of the clips retain, on the bar 49 the forward edge of a pan 89 disposed above the roller 40, the rear end of the pan 89 being supported by hooks 90, or otherwise, on the cross piece 3 of the main frame of the machine. A deflector 91 is attached to the side bar 4 and is located adjacent to the rear end of the machine.

When the ground wheel 12 is rotated, the sprocket wheels 29 and 27, together with the sprocket chain 28, rotate the shaft 25 and the reel 26, the reel exercising its well known function, and serving to carry the upstanding grass into the field of operation of the cutting mechanism. When the ground wheel 11 is rotated, motion is transmitted to the shaft 73 by the beveled gear 16 and the beveled pinion 75, the crank 79 on the forward end of the shaft 73 imparting reciprocation to the cutter bar 58 and to the blades 59, by way of the elongated head 64 on the cutter bar, wherein the member 80 on the crank travels. The member 80 is anti-frictionally supported, as indicated in Figure 4 and there is very little friction at this point, it being a matter of common knowledge that in a mowing machine, there is ordinarily, considerable friction between the actuating crank and the cutter bar.

The grass, having been severed by the knives or blades 59 of the cutting mechanism, is carried rearwardly into the pan 89. If desired, however, the pan may be taken off, under which circumstances, the deflector 91 will keep the grass in a windrow. The deflector 91 need not be employed when the pan 89 is used. Should the operator so desire, he may remove the shaft 25, the reel 26 and the chain 28.

Relative to the clutches 32 and 33, it will be understood that these members may be disengaged, when desired to the end that the reel 26 will not rotate when the mower is being drawn backwardly, the clutch 32 gripping over the clutch 33, without rotating the reel, whereas, when the mower is advanced, the reel, obviously, will be rotated.

Having thus described the invention, what is claimed is:—

1. In a mower, a frame; a ground wheel journaled on the frame; a cutter bar mounted to reciprocate on the frame; a shaft journaled in the frame; means for connecting the shaft operatively with the cutter bar; intermeshing gears on the ground wheel and on the shaft, the gear of the shaft being movable longitudinally thereon; and spring means coacting with the said gear to hold the same engaged with the gear of the ground wheel and automatically return it after disengagement therefrom.

2. In a mower, a frame, ground wheels journaled on the frame, a shaft journaled in the frame, a cutter bar mounted to reciprocate in said frame, a vertically elongated head carried by said bar, a crank connecting one end of said shaft with said head, a cup-shaped annular ball race journaled on said crank and located within said head on said bar, a cooperating ball retainer carried by said crank, and a box-like casing encompassing said head and hinged to provide access thereto.

In testimony that I claim the foregoing as my own, I have hereto affixed my signature in the presence of two witnesses.

WILLIAM ELBERT TATE, Sr.

Witnesses:
W. E. MILLIKEN,
Jos. HOPKINS.